United States Patent [19]

Sky-Eagle, Jr.

[11] 4,260,186
[45] Apr. 7, 1981

[54] DEVICE FOR HANDLING OIL LADEN PAD

[76] Inventor: William A. Sky-Eagle, Jr., 1038 Meadowbrook Dr., Corpus Christi, Tex. 78412

[21] Appl. No.: 95,568

[22] Filed: Nov. 19, 1979

[51] Int. Cl.³ .............................................. A47F 13/06
[52] U.S. Cl. .................................................. 294/19 R
[58] Field of Search ............... 294/19, 104, 22, 115, 294/995, 85, 11, 50.8, 50.9; 15/118, 247; 258/3 V

[56] References Cited

U.S. PATENT DOCUMENTS

| 1,777,395 | 10/1930 | Coon ................................... 294/19 R |
| 3,101,500 | 8/1963 | Paolantonio ........................... 15/118 |
| 3,146,015 | 8/1964 | Roberge ............................ 294/19 R |
| 3,756,096 | 9/1973 | Bolden ............................... 294/19 R |

Primary Examiner—James B. Marbert
Attorney, Agent, or Firm—Stevens, Davis, Miller & Mosher

[57] ABSTRACT

A device is provided for handling a sorbent pad soaked with oil without contact with the person using the device. The device has an elongated handle or support member and a jaw for grasping the pad fixed to one end of the support member. The jaw is formed by a stationary plate member and a pivotable plate member which are associated together. A lever is provided near the gripping end of the support member for placing a cable secured at one end to the pivotable plate member under tension to move the pivotable plate member to open the jaw. The pivotable plate member is biased by a spring towards the stationary plate member when tension on the cable is released.

4 Claims, 4 Drawing Figures

DEVICE FOR HANDLING OIL LADEN PAD

This invention relates to a device for picking up, turning over and handling a sorbent pad being used to adsorb oil and more particularly for grasping an oil laden pad which has been used to remove an oil slick from the surface of water or other surface.

Oil spilled on the surface of a body of water introduces a fire hazard and forms an oil slick which coats inanimate articles, water fowls and other forms of life which come into contact with the oil slick. It is thus often necessary to remove the oil from the water surface. Oil slicks which cover large areas are removed by skimming the oil from the surface with a barge type skimmer, such as the one disclosed in my U.S. Pat. No. 3,757,953, granted Sept. 11, 1973. However, oil frequently accumulates on the surface of water between floating vessels or other objects where a barge or similar skimming device cannot be used for removal.

It is therefore an object of this invention to provide a device for removing oil floating on water. Another object of the invention is to provide a device for holding an oil sorbent pad while it is used to adsorb oil from a surface or is saturated with oil. Still another object of the invention is to provide a device for picking up an oil sorbent pad, for holding the pad as it is used to adsorb an oil film and for handling an oil laden pad.

Other objects will become apparent from the following description with reference to the accompanying drawing wherein FIG. 1 is a perspective view of one embodiment of the device provided by the invention;

Figure 1:
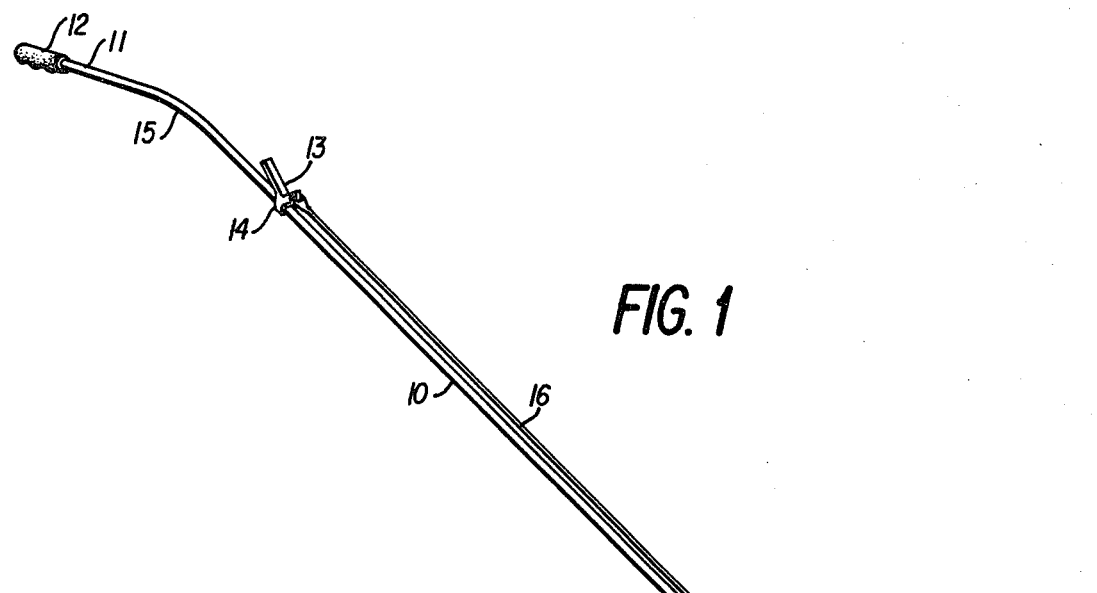

The foregoing objects and others are accomplished in accordance with this invention by providing a pick-up device for handling an oil sorbent pad remote from the person using the pad. The device provided by the invention has an elongated support member or elongated handle, means for gripping the support member at one end thereof and a hinged jaw secured to the opposite end of the support member remote from the gripping means. An operating lever is pivotally mounted on the elongated support member at a point where it can be reached by one holding the support member. The jaw has a first plate member pivotally hinged along one edge to the support member and disposed at an enclosed acute angle at its opposite edge against a stationary plate member to open the jaw for reception of an oil adsorbent or absorbent pad.

Referring now to the drawing, an elongated tubular support member 10 is bent to form an enclosed obtuse angle 15 near one end thereof and to provide a gripping portion 11. Member 10 is fixed to plate member 19. A rubber gripping member 12 is disposed over portion 11 of support member 10. A lever member 13 has a base portion 14 fixed to tubular support member 10 at a point convenient to the gripping member 12 opposite of the bend 15 from gripping member 12. A control cable 16 is operably fixed at one end to lever 13 and at its opposite end to hinged metal plate member 17. The leading edge 18 of pivotable plate member 17 rests on a stationary metal plate member 19.

Figure 2:
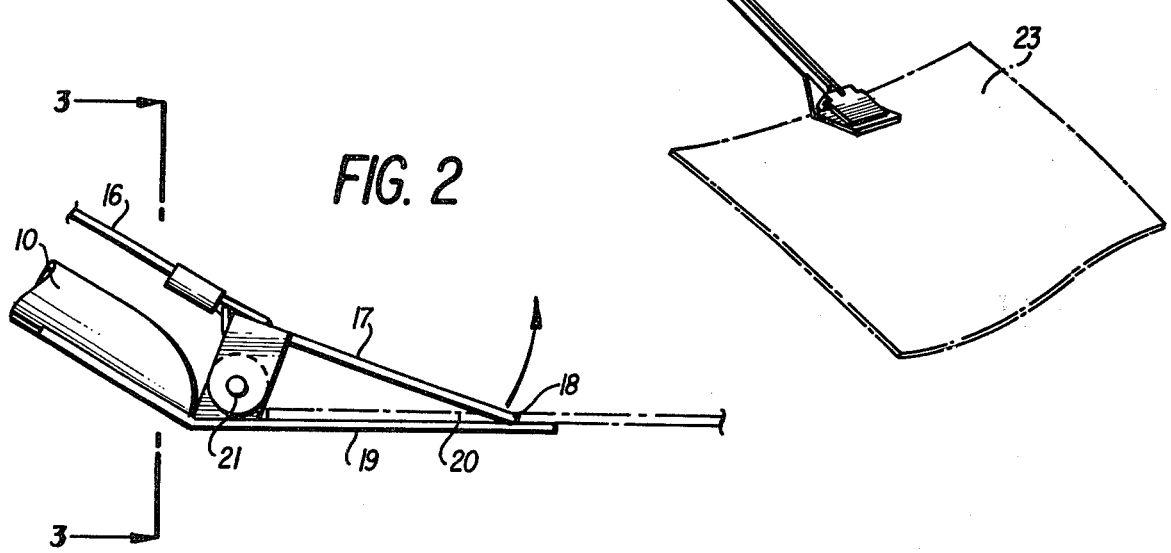
FIG. 2 is a side elevation of the jaw of the device which grasps the oil sorbent pad.
Figure 3:
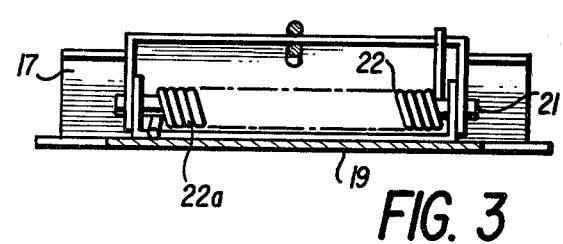
FIG. 3 is a cross-section taken along the line 3—3 of FIG. 2.
Figure 4:
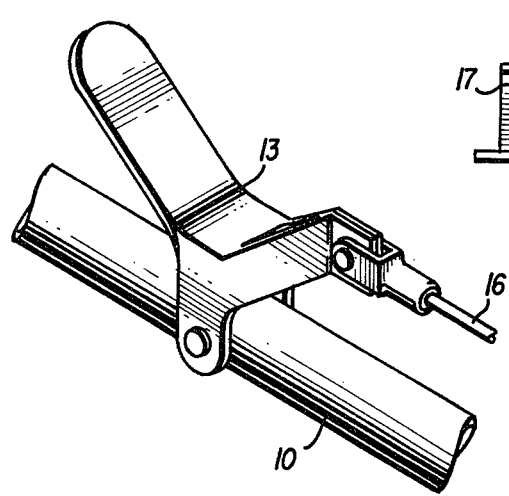
FIG. 4 is an enlarged fragmentary perspective view of the mechanism which activates the jaws which grasp the oil sorbent pad.

As shown in FIG. 2, pivotable plate member 17 rests on stationary rigid plate member 19 with an enclosed acute angle 20 therebetween. Pivotable plate member 17 is mounted on a pin 21 having coiled springs 22 and 22a wrapped therearound and biasing pivotable plate member 17 against the upper surface of stationary plate member 19 to form a jaw to hold a sorbent pad 23. Only one coiled spring can be used instead of 22 and 22a for biasing pivot plate member 17 provided it is strong enough to provide the required biasing action.

A gripping member 12 provides a means for holding the device to support it and while operating lever 13 to actuate cable 16.

In operation, the tubular support member 10 is held in both hands, one hand gripping member 12 and the other hand in position near bend 15. The jaw is opened by pivoting lever 13 with the thumb of one hand toward gripping member 12. Movement of lever 13 towards the gripping member 12 tightens cable 16 and pivots plate member 17 away from the surface of plate member 19 to open the jaw of the device. A sorbent pad may then be placed between members 17 and 19 and the lever 13 released in the direction away from gripping member 12 to release the tension on cable 16 thereby permitting plate member 17 to be biased by springs 22 and 22a against the pad 23 and thus firmly grip the pad in the jaw formed by plate members 17 and 19. The pad can then be submerged in a body of oil until it becomes sustantially saturated with oil. When it is desired to remove the pad 23 from between plate members 17 and 19, plate member 17 is moved away from plate member 19 as described above and the pad is permitted to fall by gravity from between the plate members 17 and 19.

The device provided by the invention can be used to grasp a pad saturated with oil without the operator coming into contact with the oily pad by moving the elongated member 10 until a pad 23 is disposed between plate members 17 and 19 and releasing plate member 17 to close the jaw formed by plate members 17 and 19 to grasp pad 23.

The sorbent pad may be cloth, a cellular plastic material such as felted fibers, polyurethane foam, a regenerated cellulose sponge, or the like. The support member 10 may be either a solid rod or a tubular rod.

Gripping member 12 may be made of any suitable elastomeric material such as natural rubber or a synthetic rubber such as the one commercially available under the trade name "Neoprene". Tubular support member 10 may be bent downwardly at any angle which disposes gripping portion 11 where a person standing in a substantially upright position can manipulate the device with the face of pad 23 substantially parallel to the surface of the oil to be adsorbed. An angle of about 30° between the upper surfaces of tubular member 10 on opposite sides of the bend 15 has been found to be particularly advantageous.

Although the invention has been described in detail for the purposes of illustration, it is to be understood that such detail is solely for the purpose of illustration and that variations can be made therein without departing from the spirit and scope of the invention except as it may be limited by the claims.

I claim:

1. A device for grasping an oil sorbent pad comprising an elongated support member, a stationary plate member fixed to said support member near said support member's first end and projecting forwardly from that end of the support member, a pivotable plate member hinged along one edge to said end of the support member and having its opposite edge resting on the first plate member with an enclosed acute angle between the pivotable and stationary plate members, a lever mounted on the support member where it is accessible to a person holding said support member, a control cable attached at one end to the pivotable plate member and at its opposite end to said lever for responding to movement of the lever to alternately place the cable under tension and to pivot the pivotable plate member away from the stationary plate member to provide space therebetween for an oil sorbent pad, and to release tension on the cable to release the pivotable plate member for movement towards the first plate, and means for biasing the second plate member towards the first plate member.

2. The device of claim 1 wherein the said pivotable plate member is mounted along its trailing edge on the said support member by means of a rotatable pin having its ends inserted in laterally spaced openings in a bracket fixed to said second plate member, and a spring about the pin for biasing the said pivotable plate member towards the stationary plate member.

3. A device for handling an oil laden pad comprising an elongated support member, a stationary plate member fixed to a first end of the support member and projecting outwardly from that end of the support member to lie in a plane substantially transverse of the axis of the said support member, a pivotable plate member disposed facing the first plate member with one end thereof pivotally attached to said stationary plate member and having its opposite end resting on the stationary plate member, said first end being elevated with respect to said opposite end, said pivoted plate member being attached to said stationary plate member by means of laterally spaced facing tabs extending from both plate members, said tabs each having holes and bridging the space therebetween, at least one spring biased about the pin in said space and biasing the pivotal plate member towards the stationary plate member, means for gripping the support member at its second end disposed at an enclosed angle of less than 180° with respect to the axis of said support member, a lever fixed to the support member and projecting outwardly therefrom where it can be reached while holding the support member by its gripping means, a control cable secured to the lever and to the pivotal plate whereby the cable lifts the pivotal plate member from the stationary plate when tensioned by movement of the lever towards the gripping means and permits the spring to bias the pivotal plate member towards the stationary plate when tension on the cable is released.

4. In combination, the device of claim 3 and an oil sorbent pad held in the jaw of the device.

* * * * *